US009556663B2

(12) United States Patent
Yamagiwa et al.

(10) Patent No.: US 9,556,663 B2

(45) Date of Patent: Jan. 31, 2017

(54) DOOR LOCK SYSTEM

(71) Applicants: SUMITOMO WIRING SYSTEMS, LTD., Yokkaichi-shi, Mie (JP); HONDA MOTOR CO., LTD., Tokyo (JP)

(72) Inventors: Takaaki Yamagiwa, Yokkaichi (JP); Masayuki Yamazaki, Wako (JP)

(73) Assignees: SUMITOMO WIRING SYSTEMS, LTD., Suzuka-shi (JP); HONDA MOTOR CO., LTD., Tokyo (JP)

(*) Notice: Subject to any disclaimer, the term of this patent is extended or adjusted under 35 U.S.C. 154(b) by 37 days.

(21) Appl. No.: 14/613,812

(22) Filed: Feb. 4, 2015

(65) Prior Publication Data

US 2015/0218869 A1 Aug. 6, 2015

(30) Foreign Application Priority Data

Feb. 6, 2014 (JP) ................................. 2014-021526

(51) Int. Cl.

*H04B 1/00* (2006.01)
*E05F 15/659* (2015.01)

(Continued)

(52) U.S. Cl.

CPC ............. *E05F 15/659* (2015.01); *E05B 81/54* (2013.01); *E05B 83/40* (2013.01);

(Continued)

(58) Field of Classification Search

CPC ...... H04L 27/2665; H04L 12/18; H04L 25/08; H04L 27/2657; H04N 5/4401; H04N 5/455; H04N 21/42607; H04N 21/41422; H04W 76/002

(Continued)

(56) References Cited

U.S. PATENT DOCUMENTS 3,594,036 A * 7/1971 Cadiou ...................... B60J 5/06 296/153
4,895,009 A * 1/1990 Kleefeldt ........... G07C 9/00182 70/238

(Continued)

FOREIGN PATENT DOCUMENTS

JP S58-168782 A 10/1983
JP 2006-266023 A 10/2006

(Continued)

OTHER PUBLICATIONS

Honda Odyssey manual pp. 150-151 and 189.*

(Continued)

*Primary Examiner* — Juan A Torres
(74) *Attorney, Agent, or Firm* — Oliff PLC

(57) ABSTRACT

If a second operation is performed on a driver's seat side button (or a front passenger seat side button) when a door of a vehicle is in a locked state, a controller unlocks the door and then opens a sliding door for a rear seat behind a driver's seat (or a front passenger seat). If the second operation is performed on the driver's seat side button (or the front passenger seat side button) when the door of the vehicle is in an unlocked state and the sliding door for the rear seat behind the driver's seat or the front passenger seat is in an opened state, the controller closes the sliding door and then locks the door.

8 Claims, 5 Drawing Sheets

(51) Int. Cl.
*E05B 83/40* (2014.01)
*E05B 81/54* (2014.01)
*G07C 9/00* (2006.01)
*E05B 47/00* (2006.01)

(52) U.S. Cl.
CPC .. *G07C 9/00309* (2013.01); *E05B 2047/0094* (2013.01); *E05Y 2400/10* (2013.01); *E05Y 2900/531* (2013.01); *G07C 2009/00523* (2013.01)

(58) Field of Classification Search
USPC ........................................................ 340/5.72
See application file for complete search history.

(56) References Cited

U.S. PATENT DOCUMENTS

| | | | | |
|---|---|---|---|---|
| 5,140,316 A * | 8/1992 | DeLand | B60J 5/06 180/271 |
| 5,986,420 A * | 11/1999 | Kato | E05F 15/619 318/1 |
| 6,135,513 A * | 10/2000 | Hamada | E05B 77/26 292/201 |
| 2001/0005084 A1 | 6/2001 | Ponziani | |
| 2003/0007851 A1 | 1/2003 | Heigl et al. | |
| 2003/0189481 A1 | 10/2003 | Hamid | |
| 2003/0222758 A1 | 12/2003 | Willats et al. | |
| 2006/0214769 A1 | 9/2006 | Nakashima et al. | |
| 2015/0120151 A1* | 4/2015 | Akay | B60R 25/24 701/49 |

FOREIGN PATENT DOCUMENTS

| | | |
|---|---|---|
| JP | 2011058329 A | 3/2011 |
| JP | 2013-133654 A | 7/2013 |

OTHER PUBLICATIONS

Jul. 19, 2016 Office Action issued in Japanese Application No. 2014-021526.

Sep. 2, 2016 Notification of First Office Action issued in Chinese Application No. 201510060909.0.

* cited by examiner

DOOR LOCK SYSTEM

CROSS-REFERENCE TO RELATED APPLICATION

This Non-provisional application claims priority under 35 U.S.C. §119(a) on Patent Application No. 2014-021526 filed in Japan on Feb. 6, 2014, the entire contents of which are hereby incorporated by reference.

BACKGROUND

1. Technical Field

The present invention relates to a door lock system for allowing a user to lock and unlock a door of a vehicle by operating an operation unit provided on an outer surface of the door.

2. Description of Related Art

In a vehicle, a door lock system for locking or unlocking a door of the vehicle when a user carrying a vehicle key assigned to the vehicle performs a pressing operation, a touch operation or the like in an operation unit provided on an outer surface of the door of the vehicle, that is, what is called a smart entry system, is installed (see, for example, Japanese Patent Application Laid Open No. 2011-58329). The operation unit of the door lock system is provided, for example, in the vicinity of a door handle used for opening/closing the door, and may be provided in the vicinity of door handles of all the doors of the vehicle in some cases.

Besides, in a vehicle using a sliding door as a rear seat door, a door lock system capable of not only performing a door locking/unlocking operation but also automatically performing a closing/opening operation of the sliding door when a user performs an operation in an operation unit provided on the sliding door may be installed. In using this door lock system, for example, if a user performs an operation in the operation unit provided on the sliding door when the doors of the vehicle are locked, the doors of the vehicle are unlocked, and thereafter, an opening operation of the sliding door is performed (namely, the sliding door is opened). Alternatively, if the user performs an operation in the operation unit provided on the sliding door when the sliding door is opened, a closing operation of the sliding door is performed (namely, the sliding door is closed), and thereafter, the doors of the vehicle are locked.

SUMMARY

In a vehicle using a sliding door as a rear seat door, it is necessary to provide an operation unit on each sliding door for automatically opening/closing the sliding door, which leads to a problem of cost increase. Besides, since the operation unit is provided on the outer surface of each door, there is a fear of degradation in design of the door.

The present invention has been made with the aim of solving the above problems. It is an object of the present invention to provide a door lock system in which not only an operation of locking/unlocking doors of a vehicle but also an operation of opening/closing a sliding door for a rear seat can be performed through an operation unit provided on a door for a front seat of the vehicle.

A door lock system according to the present invention is a door lock system for locking and unlocking a door of a vehicle provided with a sliding door for a rear seat. The door lock system includes: an operation unit provided on or in the vicinity of an outer surface of a door for a front seat of the vehicle, and accepting a first operation of locking or unlocking the door of the vehicle and a second operation different from the first operation; a door lock device for unlocking the door if the operation unit accepts the first operation or the second operation when the door is in a locked state; and a door controller for opening the sliding door after the door lock device unlocks the door if the operation unit accepts the second operation when the door is in a locked state.

According to the present invention, the operation unit is provided on or in the vicinity of the outer surface of the door for a front seat of the vehicle, and the operation unit accepts the first operation or the second operation. If the operation unit accepts the second operation when the door of the vehicle is in a locked state, the door is unlocked, and then, the sliding door for a rear seat of the vehicle is opened. Alternatively, if the operation unit accepts the first operation when the door of the vehicle is in a locked state, the door is merely unlocked. Accordingly, a user can instruct whether or not the sliding door for a rear seat is to be opened after unlocking the door in accordance with which of the first operation or the second operation is performed on the operation unit. Besides, the door is unlocked and the sliding door is opened by a user performing the second operation on the operation unit only once, and thus, good operability can be obtained.

In the door lock system according to the present invention, the door controller closes the sliding door if the operation unit accepts the second operation when the sliding door is in an opened state, and the door lock device locks the door after the door controller closes the sliding door if the operation unit accepts the second operation when the sliding door is in an opened state.

According to the present invention, if the operation unit accepts the second operation when the sliding door for a rear seat of the vehicle is in an opened state, the sliding door is closed, and then, the door is locked. Accordingly, if the sliding door for a rear seat is opened, the sliding door is closed and the door is locked by a user performing the second operation on the operation unit provided on the door for a front seat. For example, if a driver goes out of the vehicle from the driver's seat, the sliding door can be closed and the door can be locked by the driver performing the second operation on the operation unit provided on the door on the driver's seat side, and thus, good operability can be obtained.

In the door lock system according to the present invention, the operation unit is provided on or in the vicinity of an outer surface of a door on a driver's seat side and/or on or in the vicinity of an outer surface of a door on a front passenger seat side, and if the operation unit accepts the second operation, the door controller opens or closes a sliding door provided for a rear seat on the same side as the door provided with the operation unit having been operated.

According to the present invention, if the operation unit provided on or in the vicinity of the outer surface of the door on the driver's seat side accepts the second operation, the sliding door for the rear seat behind the driver's seat is opened or closed. Alternatively, if the operation unit provided on or in the vicinity of the outer surface of the door on the front passenger seat side accepts the second operation, the sliding door for the rear seat behind the front passenger seat is opened or closed. Accordingly, a user operating the operation unit can visually check the sliding door to be opened or closed, and the other sliding door positioned in a blind spot of the user is not opened or closed, and thus, safety can be assured.

The door lock system according to the present invention includes: a vehicle key having a memory unit storing authentication information assigned to the vehicle, and a transmission unit transmitting, by wireless, the authentication information stored in the memory unit; a wireless reception unit receiving, by wireless, the authentication information transmitted by the vehicle key; and an authentication unit determining whether or not the authentication information received by the wireless reception unit is appropriate. And the door lock device unlocks the door if the authentication unit determines that the authentication information is appropriate.

According to the present invention, the door lock system includes the vehicle key that stores the authentication information assigned to the vehicle and transmits the stored authentication information by wireless. The door lock system also includes the wireless reception unit receiving the authentication information transmitted from the vehicle key, and the authentication unit determining whether or not the authentication information received by the wireless reception unit is appropriate. If the authentication unit determines that the authentication information is appropriate, the door lock device unlocks the door of the vehicle. Accordingly, since the authentication processing thus using the vehicle key assigned to the vehicle is performed, merely an operation performed by a user carrying the vehicle key can be effective.

In the door lock system according to the present invention, the operation unit is an operation button accepting a pressing operation.

In the door lock system according to the present invention, the first operation is an operation in which a continuous pressing time for the operation button is shorter than a prescribed time, and the second operation is an operation in which the continuous pressing time for the operation button is equal to or longer than the prescribed time.

According to the present invention, the operation unit provided on or in the vicinity of the outer surface of the door for a front seat of the vehicle is an operation button for accepting a pressing operation. And the first operation performed on the operation unit is a short pressing operation in which the continuous pressing time for the operation button is shorter than a prescribed time, and the second operation is a long pressing operation in which the continuous pressing time is equal to or longer than the prescribed time. Accordingly, the first operation and the second operation can be switchingly performed by changing the time for continuously pressing the operation button, and thus, an easily operable operation unit can be realized.

In the door lock system according to the present invention, the operation unit is a sensor accepting a touch operation or a proximity operation.

In the door lock system according to the present invention, the first operation is an operation in which a time of continuously touching or approximating to the sensor is shorter than a prescribed time, and the second operation is an operation in which the time of continuously touching or approximating to the sensor is equal to or longer than the prescribed time.

According to the present invention, the operation unit provided on or in the vicinity of the outer surface of the door for a front seat of the vehicle is a sensor for accepting a touch operation or a proximity operation. And the first operation performed on the operation unit is a short time operation in which a time of continuously touching or approximating to the sensor is shorter than a prescribed time, and the second operation is a long time operation in which the time of continuously touching or approximating to the sensor is equal to or longer than the prescribed time. Accordingly, the first operation and the second operation can be switchingly performed by changing the time of continuously touching or approximating to the sensor, and thus, an easily operable operation unit can be realized.

In the door lock system according to the present invention, the operation unit accepts a third operation different from the first operation and the second operation. If the operation unit provided on the driver's seat side or the front passenger seat side accepts the third operation, the door controller opens or closes both of the sliding doors for rear seats on the driver's seat side and the front passenger seat side.

According to the present invention, the operation unit is configured to accept the third operation. And if the operation unit accepts the third operation, sliding doors provided for rear seats respectively behind the driver's seat and the front passenger seat are opened or closed. Accordingly, a user can open/close both the sliding door for the rear seat on the driver's seat side and the sliding door for the rear seat on the front passenger seat side by performing the third operation on the operation unit provided on the door on either the driver's seat side or the front passenger seat side, and thus, good operability can be obtained.

According to the present invention, not only the operation of locking and unlocking the door of the vehicle but also the operation of opening and closing the sliding door for a rear seat can be performed by using the operation unit provided on the door for a front seat. Accordingly, there is no need to provide the operation unit for the sliding door for a rear seat, and hence, the cost can be reduced, and the design of the door is not impaired.

The above and further objects and features of the invention will more fully be apparent from the following detailed description with accompanying drawings.

DETAILED DESCRIPTION

The following will describe in detail a door lock system according to the present invention with reference to the drawings showing an embodiments thereof.

Figure 1A:
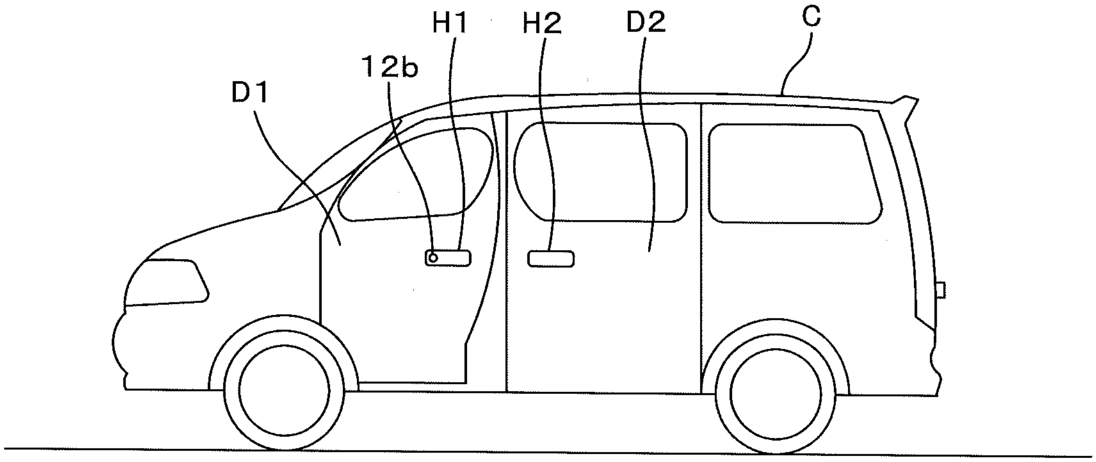
FIG. 1A is a side view of a vehicle in which a door lock system according to an embodiment of the present invention is installed.
Figure 1B:
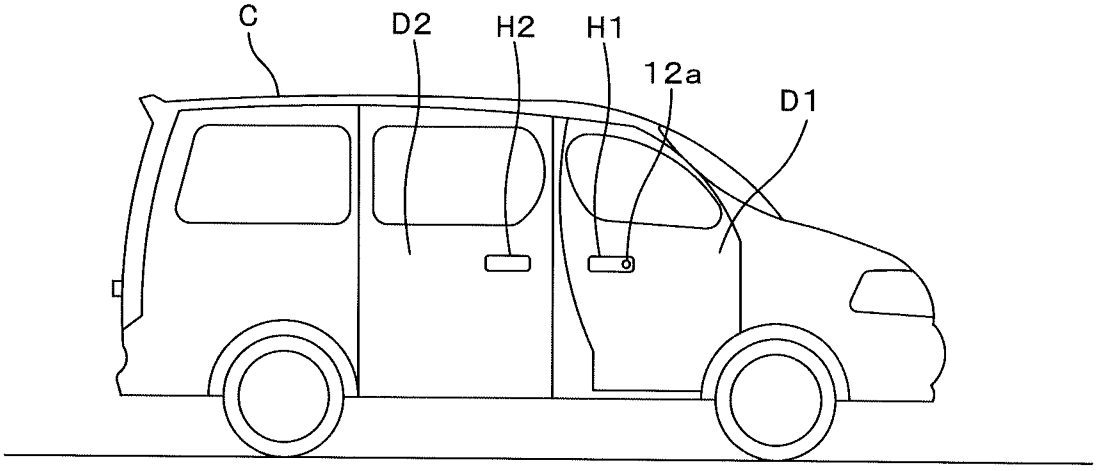
FIG. 1B is a side view of a vehicle in which a door lock system according to an embodiment of the present invention is installed.
Figure 2:
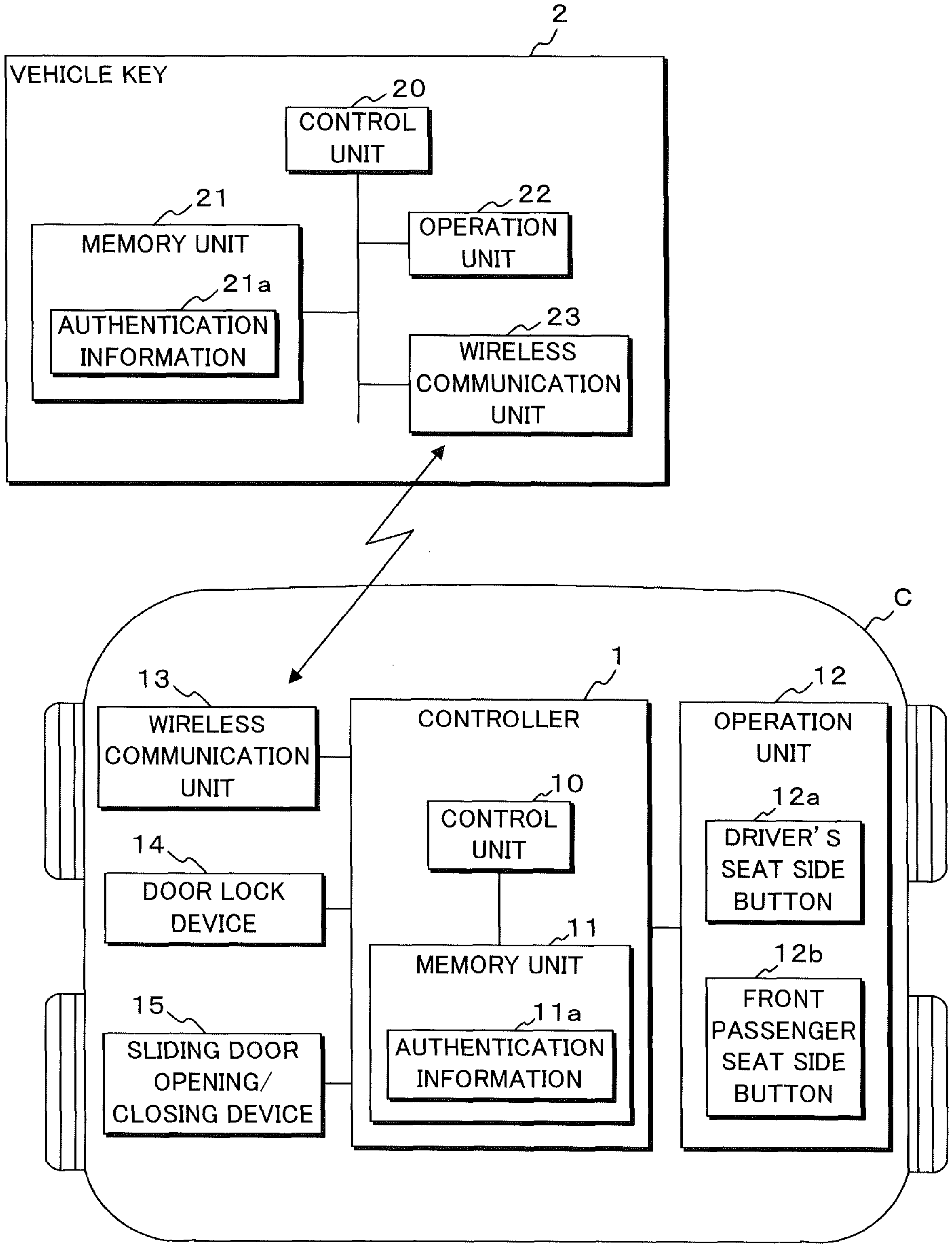
FIG. 2 is a block view illustrating a configuration of the door lock system according to the embodiment.

FIGS. 1A and 1B are side views of a vehicle in which a door lock system according to the present embodiment is installed, and FIG. 2 is a block view illustrating a configuration of the door lock system according to the present embodiment. FIG. 1A illustrates the left side of the vehicle C in which the driver's seat is provided on the right-hand side in the travel direction of the vehicle C, and FIG. 1B illustrates the right side of the vehicle C. The door lock system of the present embodiment is what is called a smart entry system, and is installed in a vehicle C as illustrated in FIGS. 1A and 1B. In the vehicle C, a hinge door D1 to be opened/closed by swinging outward with a prescribed portion used as a fulcrum is provided for each of front seats (a driver's seat and a front passenger seat), and a sliding door D2 to be opened/closed along the body of the vehicle C is provided for each rear seat. Besides, on the outer surface of each of the doors D1 and D2 of the vehicle C, a door handle H1 or H2 for opening or opening/closing the door D1 or D2 is provided. Furthermore, an operation buttons 12*a* and 12*b* for accepting an operation of locking/unlocking the doors D1 and D2 of the vehicle C is provided in or in the vicinity of the door handle H1 of each hinge door D1. Here, the operation button provided in the door handle H1 on the driver's seat side is called a driver's seat side button 12*a*, and the operation button provided in the door handle H1 on the front passenger seat side is called a front passenger seat side button 12*b*. Besides, the positions of the driver's seat side button 12*a* and the front passenger seat side button 12*b* are not limited to the door handles H1 of the hinge doors D1 but these buttons may be provided on the outer surfaces of the hinge doors D1 other than the door handles H1 or the outer surfaces of A-pillars, B-pillars or the like.

In the vehicle C, an operation unit 12, a wireless communication unit 13, a door lock device 14, a sliding door opening/closing device 15 and the like are installed, and these units and devices are connected to a controller 1.

The controller 1 includes a control unit 10 such as a CPU (central processing unit) or an MPU (microprocessor unit), a memory unit 11 such as an EEPROM (electrically erasable programmable read only memory) or a flash memory, and the like. The memory unit 11 stores a control program to be executed by the control unit 10, various data including authentication information 11*a*, data generated in executing the control program by the control unit 10, and the like. The controller 1 controls the operations of the aforementioned devices by reading and executing, by the control unit 10, the control program stored in the memory unit 11, and thus, an operation as the door lock system of the present invention is realized. The authentication information 11*a* is peculiar identification information assigned to the vehicle C and is precedently stored in the memory unit 11.

The operation unit 12 includes the driver's seat side button 12*a* and the front passenger seat side button 12*b* (hereinafter sometimes together referred to as the operation buttons 12*a* and 12*b*) and the like. Each of the operation buttons 12*a* and 12*b* is, for example, a pressing type button for accepting a pressing operation, and is configured to accept a first operation and a second operation different from each other. For example, the first operation is a short pressing operation in which a time for continuously pressing the operation button 12*a* or 12*b* (i.e., a continuous pressing time) is shorter than a prescribed time (of, for example, 2 or 3 seconds), and the second operation is a long pressing operation in which the continuous pressing time is equal to or longer than the prescribed time. If the operation button 12*a* or 12*b* is operated, the operation button 12*a* or 12*b* outputs a prescribed signal to the controller 1, and the output of this prescribed signal to the controller 1 is continued while the operation button 12*a* or 12*b* is being operated. Accordingly, the controller 1 can grasp, on the basis of the output signal from the operation button 12*a* or 12*b*, which of the first operation (the short pressing operation) or the second operation (the long pressing operation) is performed on which of the operation buttons 12*a* and 12*b*.

Each of the operation buttons 12*a* and 12*b* is not limited to the pressing type button but may be a sensor for accepting a touch operation or a proximity operation. In this case, the first operation may be, for example, a short time operation in which a time for continuously touching or approximating to the sensor (i.e., the operation button 12*a* or 12*b*) is shorter than a prescribed time (of, for example, 2 or 3 seconds), and the second operation may be a long time operation in which the time is equal to or longer than the prescribed time. Incidentally, with respect to the short time operation, in order to prevent a determination error (a detection error) of the sensor, it may be determined that a short time operation has been performed when the time for touching or approximating to the sensor exceeds a time corresponding to the effectiveness of an operation (of, for example, 1 second).

The operation unit 12 includes, in addition to the operation buttons 12*a* and 12*b*, various operation buttons necessary for accepting operations for various devices installed in the vehicle C.

To the wireless communication unit 13, a transmission antenna (not shown) provided in an appropriate position on the vehicle C is connected, so that the wireless communication unit 13 can transmit a signal via the transmission antenna by using radio waves of a precedently set frequency. The wireless communication unit 13 transmits a signal supplied from the controller 1 in accordance with an instruction given by the controller 1. The signal transmitted by the wireless communication unit 13 is received by an external device (such as a vehicle key 2) present in a communication range.

Besides, to the wireless communication unit (corresponding to a wireless reception unit) 13, a reception antenna (not shown) provided in an appropriate position on the vehicle C is connected, so that the wireless communication unit 13 can receive, via the reception antenna, a signal transmitted by using radio waves of a precedently set frequency. If the wireless communication unit 13 receives a signal transmitted from an external device (such as the vehicle key 2) present in the communication range, it sends the received signal to the controller 1.

The door lock device 14 includes a mechanism for locking/unlocking the doors D1 and D2 of the vehicle C, a power source, such as a motor or an actuator, for operating the mechanism, a drive circuit for driving the power source, and the like. The door lock device 14 operates the drive circuit in accordance with an instruction issued by the controller 1, so as to lock/unlock each of the doors D1 and D2 of the vehicle C.

The sliding door opening/closing device (corresponding to a door controller) 15 includes a mechanism for opening/closing a sliding door D2 of the vehicle C, a power source, such as a motor or an actuator, for operating the mechanism, a drive circuit for driving the power source, and the like. The sliding door opening/closing device 15 operates the drive circuit in accordance with an instruction issued by the controller 1, so as to open/close each sliding door D2 of the vehicle C. The sliding door opening/closing device 15 is provided on each of the two sliding doors D2 for opening/closing the corresponding one of the sliding doors D2.

Although the wireless communication unit 13 is connected to the controller 1 in the door lock system of the present embodiment, the controller 1 may be equipped with the function of the wireless communication unit 13.

The vehicle key 2 includes a control unit 20, a memory unit 21, an operation unit 22, a wireless communication unit 23 and the like, all of which are mutually connected.

The control unit 20 is, for example, a CPU or an MPU. The control unit 20 performs an operation as the vehicle key 2 by reading and executing a control program stored in the memory unit 21. The memory unit 21 is, for example, an EEPROM, a flash memory or the like. The memory unit 21 stores the control program to be executed by the control unit 20, various data including authentication information 21*a*, data generated in executing the control program by the control unit 20, and the like. The authentication information 21*a* is peculiar identification information assigned to the vehicle C operable by the corresponding vehicle key 2, and is precedently stored in the memory unit 21.

The operation unit 22 includes a plurality of operation buttons necessary for accepting operations for various devices installed in the vehicle C. If any of the operation buttons is operated, the operation unit 22 outputs a signal corresponding to the operated operation button to the control unit 20. The control unit 20 can grasp, on the basis of the output signal from the operation unit 22, which of the operation buttons has been operated. The operation buttons provided in the operation unit 22 are, for example, a lock button for indicating a locking operation of the doors of the vehicle C and an unlock button for indicating an unlocking operation of the doors of the vehicle C.

To the wireless communication unit (corresponding to a transmission unit) 23, a transmission antenna (not shown) provided in an appropriate position on the vehicle key 2 is connected, so that the wireless communication unit 23 can transmit a signal via the transmission antenna by using radio waves of a precedently set frequency. The wireless communication unit 23 transmits a signal supplied from the control unit 20 in accordance with an instruction issued by the control unit 20. The signal transmitted by the wireless communication unit 23 is received by an external device (such as the wireless communication unit 13) present in a communication range.

Besides, to the wireless communication unit 23, a reception antenna (not shown) provided in an appropriate position on the vehicle key 2 is connected, so that the wireless communication unit 23 can receive, via the reception antenna, a signal transmitted by using radio waves of a precedently set frequency. If the wireless communication unit 23 receives a signal transmitted from an external device (such as the wireless communication unit 13) present in a communication range, it sends the received signal to the control unit 20.

In the door lock system of the present embodiment, if a user carrying the vehicle key 2 performs the first operation (such as the short pressing operation) on the operation button 12*a* or 12*b*, the doors D1 and D2 of the vehicle C are locked or unlocked. Incidentally, if the doors D1 and D2 of the vehicle C are in a locked state when the operation button 12*a* or 12*b* is operated, an unlocking operation is performed, and if the doors D1 and D2 are in an unlocked state, a locking operation is performed. Alternatively, in the door lock system of the present embodiment, if a user carrying the vehicle key 2 performs the second operation (such as the long pressing operation) on the operation button 12*a* or 12*b*, the doors D1 and D2 of the vehicle C are locked or unlocked, and the sliding door D2 for the rear seat is opened or closed. Incidentally, if the doors D1 and D2 of the vehicle C are in a locked state when the operation button 12*a* or 12*b* is operated, the unlocking operation and an opening operation for the sliding door D2 are performed, and if the sliding door D2 is in an opened state, a closing operation for the sliding door D2 and the locking operation are performed. The opened state of the sliding door D2 indicates a non-closed state. Therefore, the opened state is not limited to a fully opened state, may be a little opened state, an opened state such that a person can get into and off the vehicle, or the like.

In the door lock system of the present embodiment, the processing performed by the controller 1 and the vehicle key 2 when the driver's seat side button 12*a* or the front passenger seat side button 12*b* provided on the vehicle C is operated by a user will be described.

Figure 3A:
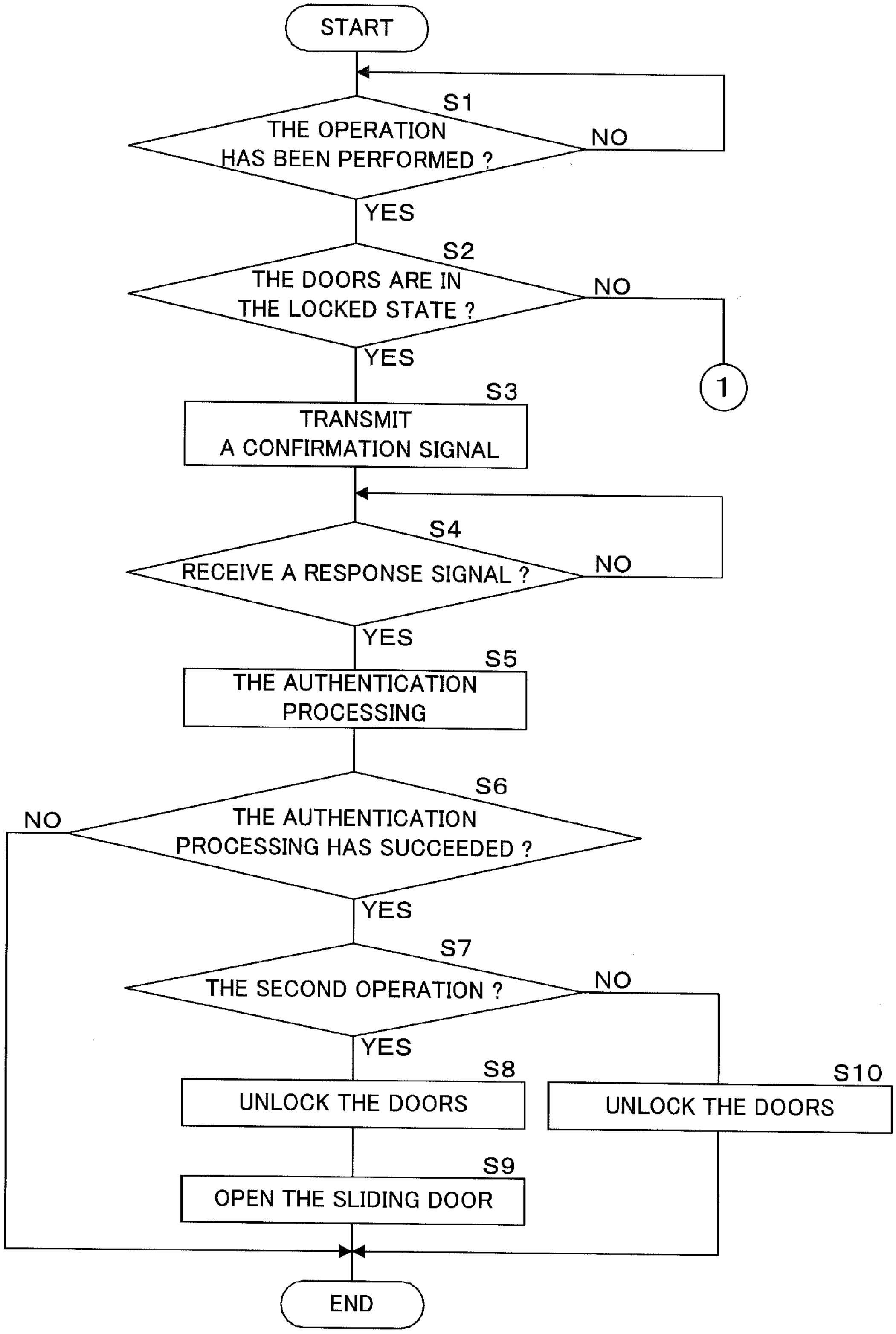
FIG. 3A is a flowchart illustrating a procedure of processing performed by a controller.
Figure 3B:
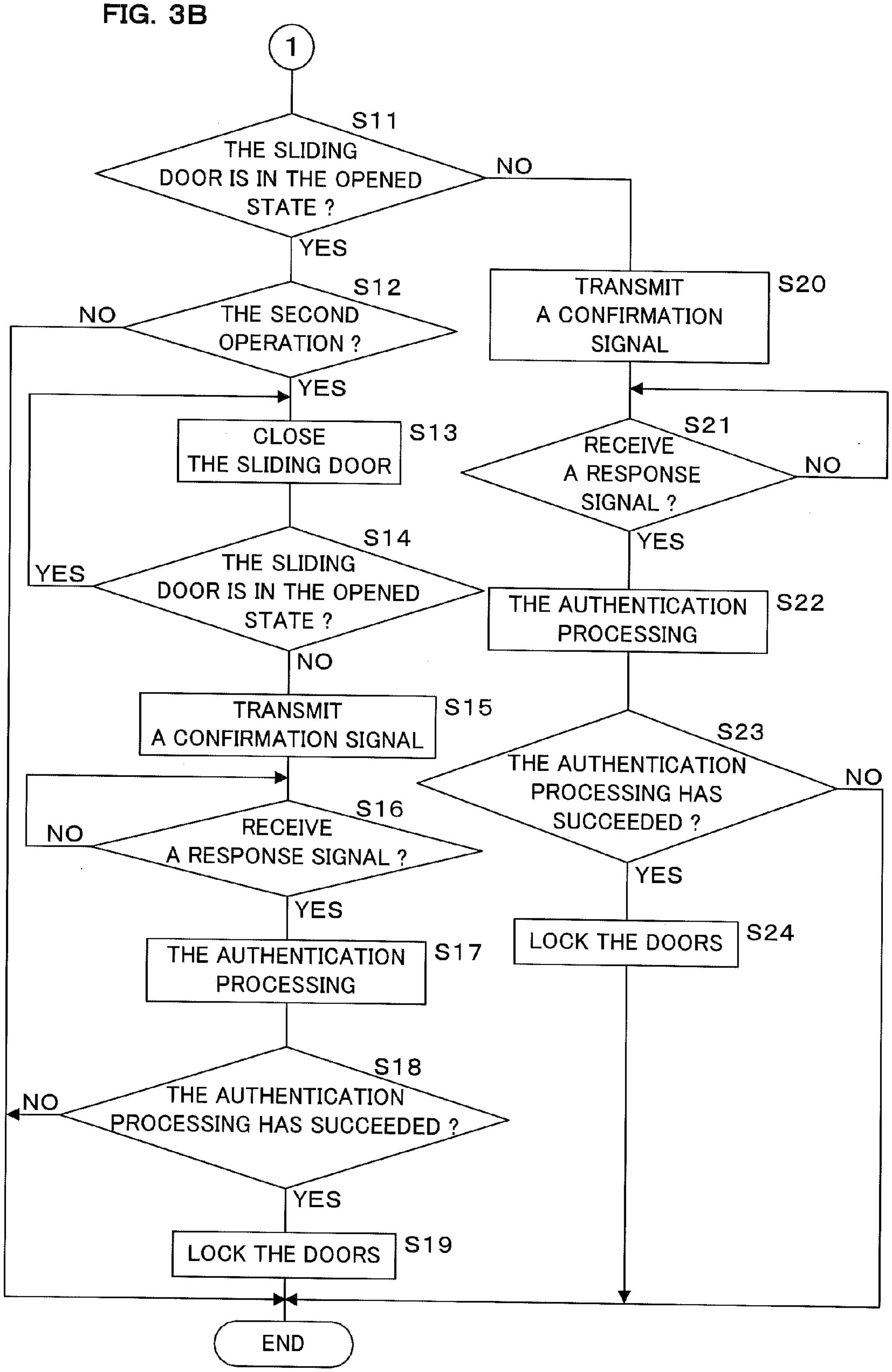
FIG. 3B is a flowchart illustrating a procedure of processing performed by a controller.

First, the processing performed by the controller 1 will be described. FIGS. 3A and 3B are flowcharts illustrating procedures of the processing performed by the controller 1. The controller 1 determines whether or not a user operation has been performed on the driver's seat side button 12*a* or the front passenger seat side button 12*b* in accordance with whether or not a prescribed signal has been obtained from the operation unit 12 (S1). If it is determined that the operation has not been performed (S1: NO), the controller 1 waits until the operation is performed while performing other processing.

When it is determined that the user operation has been performed on the driver's seat side button 12*a* or the front passenger seat side button 12*b* (S1: YES), the controller 1 determines, on the basis of states of the respective components of the door lock device 14, whether or not the doors D1 and D2 of the vehicle C are now in a locked state (S2). When it is determined that they are in the locked state (S2: YES), the controller 1 transmits, by the wireless communication unit 13, a confirmation signal (a prescribed signal) including the authentication information 11*a* stored in the memory unit 11 (S3). Incidentally, when it is determined that the user operation has been performed, the controller 1 determines which of the first operation (such as the short pressing operation) or the second operation (such as the long pressing operation) has been performed on which of the driver's seat side button 12*a* or the front passenger seat side button 12*b*.

After transmitting the confirmation signal, the controller 1 determines whether or not a response signal transmitted from the vehicle key 2 has been received by the wireless communication unit 13 (S4), and if it is determined that the signal has not been received (S4: NO), the controller 1 waits until the signal is received.

If it is determined that the response signal has been received by the wireless communication unit 13 (S4: YES), the controller 1 (corresponding to an authentication unit) performs authentication processing for determining whether or not the received response signal is a signal transmitted from the appropriate vehicle key 2 (namely, the vehicle key 2 assigned to the vehicle C) (S5). Incidentally, the response signal transmitted from the vehicle key 2 includes the authentication information 21*a* stored in the memory unit 21 of the vehicle key 2, and the controller 1 compares the authentication information included in the response signal with the authentication information 11*a* stored in the memory unit 11. If the authentication information included in the response signal accords with the authentication information 11*a*, the controller 1 determines that the authentication information included in the response signal is appropriate and that the response signal is a signal from the appropriate vehicle key 2 (namely, the authentication processing has succeeded).

The controller 1 determines whether or not the authentication processing has succeeded (S6), and if it is determined that the authentication processing has not succeeded (S6: NO), the controller 1 terminates the processing. Incidentally, failure of the authentication processing includes not only a case where the authentication information included in the received response signal is not appropriate but also, for example, a case where the response signal is not received and a case where the received response signal includes no authentication information.

When it is determined that the authentication processing has succeeded (S6: YES), the controller 1 determines whether or not the user operation performed in step S1 is the second operation (S7). If it is determined that the user operation is the second operation (S7: YES), the controller 1 controls the door lock device 14 to unlock the doors D1 and D2 of the vehicle C (S8). Besides, if the user operation performed in step S1 is the second operation performed on the driver's seat side button 12*a*, the controller 1 controls the sliding door opening/closing device 15 to open the sliding door D2 for a rear seat behind the driver's seat, and if it is the second operation performed on the front passenger seat side button 12*b*, the controller 1 controls the sliding door opening/closing device 15 to open the sliding door D2 for a rear seat behind the front passenger seat (S9), and then terminates the processing.

Specifically, if the second operation is performed on the driver's seat side button 12*a* or the front passenger seat side button 12*b* when the doors D1 and D2 of the vehicle C are in a locked state, the controller 1 accepts the second operation as an instruction to execute an unlocking operation of the doors D1 and D2 and an opening operation of the sliding door D2. Accordingly, the controller 1 unlocks the doors D1 and D2, and then, opens the sliding door D2 for the rear seat behind the driver's seat or the front passenger seat.

If it is determined in step S7 that the user operation is not the second operation (S7: NO), namely, it is determined that the user operation is the first operation, the controller 1 controls the door lock device 14 to unlock the doors D1 and D2 of the vehicle C (S10), and terminates the processing.

Specifically, if the first operation is performed on the driver's seat side button 12*a* or the front passenger seat side button 12*b* when the doors D1 and D2 of the vehicle C are in the locked state, the controller 1 accepts the first operation as an instruction to execute an unlocking operation of the doors D1 and D2. Then, the controller 1 performs merely the unlocking operation of the doors D1 and D2.

If it is determined in step S2 that the doors D1 and D2 of the vehicle C are not in the locked state (S2: NO), the controller 1 determines, on the basis of the states of respective components of the sliding door opening/closing device 15, whether or not the sliding door D2 of the vehicle C is now in an opened state (S11). If it is determined that the sliding door D2 is in the opened state (S11: YES), the controller 1 determines whether or not the user operation performed in step S1 is the second operation (S12). If it is determined that the user operation is the second operation (S12: YES), the controller 1 controls the sliding door opening/closing device 15 to close the sliding door D2 being in the opened state (S13). The controller 1 determines again whether or not the sliding door D2 is in the opened state (S14), and if it is determined that the sliding door D2 is in the opened state (S14: YES), the processing of step S13 is continued.

If it is determined that the sliding door D2 is not in the opened state (S14: NO), the controller 1 transmits a confirmation signal including the authentication information 11*a* stored in the memory unit 11 by the wireless communication unit 13 in the same manner as in step S3 (S15). After transmitting the confirmation signal, the controller 1 determines whether or not a response signal transmitted from the vehicle key 2 has been received by the wireless communication unit 13 in the same manner as in step S4 (S16). If it is determined that the response signal has not been received (S16: NO), the controller 1 waits until the response signal is received.

If it is determined that the response signal has been received by the wireless communication unit 13 (S16: YES), the controller 1 performs the authentication processing for determining whether or not the received response signal is a signal transmitted from the appropriate vehicle key 2 in the same manner as in step S5 (S17).

The controller 1 determines whether or not the authentication processing has succeeded (S18), and if it is determined that the authentication processing has succeeded (S18: YES), the controller 1 controls the door lock device 14 to lock the doors D1 and D2 of the vehicle C (S19), and terminates the processing.

Specifically, if the second operation is performed on the driver's seat side button 12*a* or the front passenger seat side button 12*b* when the doors D1 and D2 of the vehicle C are in the unlocked state and the sliding door D2 is the opened state, the controller 1 accepts the second operation as an instruction to execute a locking operation of the doors D1 and D2 and a closing operation of the sliding door D2. Accordingly, the controller 1 closes the sliding door D2 at this point, and thereafter, locks the doors D1 and D2.

If it is determined in step S12 that the user operation performed in step S1 is not the second operation (S12: NO), the controller 1 terminates the processing without performing any operation.

Specifically, if the first operation is performed on the driver's seat side button 12*a* or the front passenger seat side button 12*b* when the doors D1 and D2 of the vehicle C are in the unlocked state and the sliding door D2 is in the opened state, the controller 1 performs no operation. Besides, if it is determined in step S18 that the authentication processing has not succeeded (S18: NO), the controller 1 terminates the processing.

If it is determined in step S11 that the sliding door D2 of the vehicle C is not in the opened state (S11: NO), the controller 1 transmits a confirmation signal including the authentication information 11*a* stored in the memory unit 11 by the wireless communication unit 13 in the same manner as in step S3 (S20). After transmitting the confirmation signal, the controller 1 determines whether or not a response signal transmitted from the vehicle key 2 has been received by the wireless communication unit 13 in the same manner as in step S4 (S21), and if it is determined that the response signal has not been received (S21: NO), the controller 1 waits until the response signal is received.

If it is determined that the response signal has been received by the wireless communication unit 13 (S21: YES), the controller 1 performs the authentication processing for determining whether or not the received response signal is a signal transmitted from the appropriate vehicle key 2 in the same manner as in step S5 (S22).

The controller 1 determines whether or not the authentication processing has succeeded (S23), and if it is determined that the authentication processing has succeeded (S23: YES), the controller 1 controls the door lock device 14 to lock the doors D1 and D2 of the vehicle C (S24), and terminates the processing.

Specifically, if the first operation or the second operation is performed on the driver's seat side button 12*a* or the front passenger seat side button 12*b* when the doors D1 and D2 of the vehicle C are in the unlocked state and the sliding door D2 is in the closed state, the controller 1 accepts the first operation or the second operation as an instruction to execute a locking operation of the doors D1 and D2.

Accordingly, the controller 1 performs merely the locking processing of the doors D1 and D2 in this case. Besides, if it is determined in step S23 that the authentication processing has not succeeded (S23: NO), the controller 1 terminates the processing.

Figure 4:
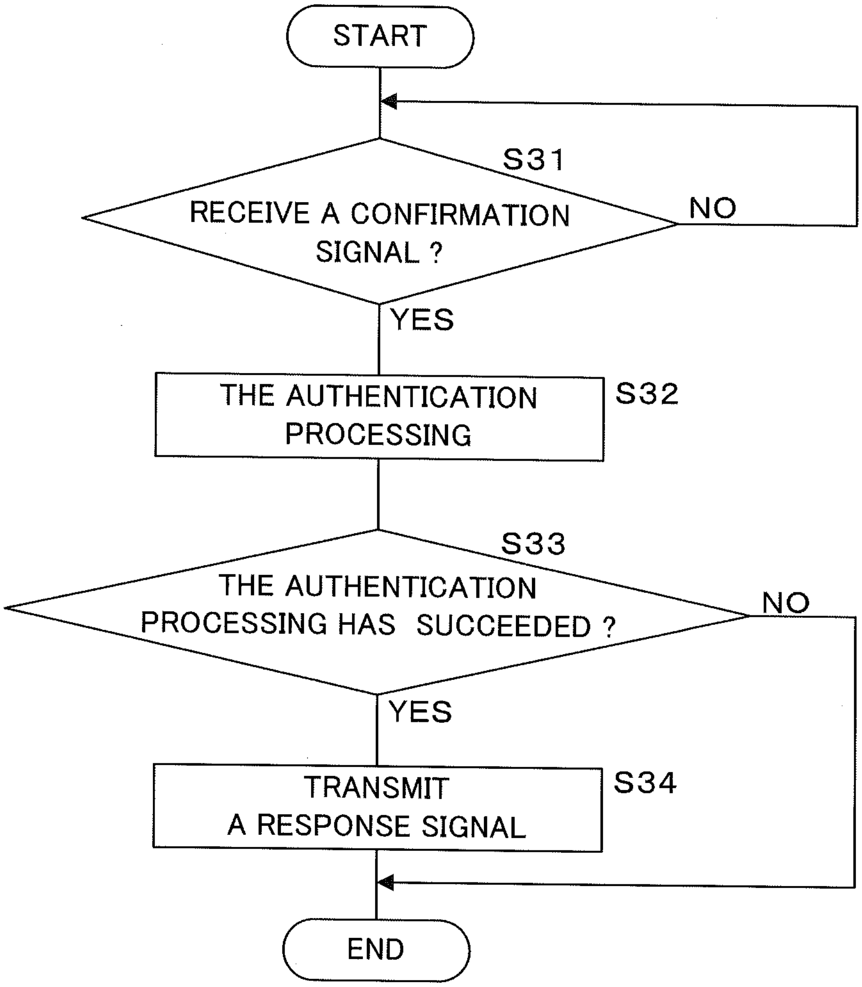
FIG. 4 is a flowchart illustrating a procedure of processing performed by a vehicle key.

Next, the processing performed by the vehicle key 2 will be described. FIG. 4 is a flowchart illustrating a procedure of the processing performed by the vehicle key 2. The control unit 20 of the vehicle key 2 determines whether or not a confirmation signal transmitted from an external device (specifically, the controller 1) has been received by the wireless communication unit 23 (S31), and if it is determined that the confirmation signal has not been received (S31: NO), the control unit 20 waits until the confirmation signal is received. Specifically, the control unit 20 determines whether or not the confirmation signal transmitted by the controller 1 in step S3, S15 or S20 of FIG. 3A or 3B has been received.

If it is determined that the confirmation signal has been received by the wireless communication unit 23 (S31: YES), the control unit 20 of the vehicle key 2 performs authentication processing for determining whether or not the received confirmation signal is a signal transmitted from the appropriate controller 1 (S32). Specifically, the control unit 20 determines whether or not the received confirmation signal is a signal transmitted from the controller 1 (the wireless communication unit 13) installed in the vehicle C to which the vehicle key 2 is assigned. Incidentally, the confirmation signal transmitted from the controller 1 includes the authentication information 11*a* stored in the memory unit 11 of the controller 1, and the control unit 20 of the vehicle key 2 compares the authentication information included in the confirmation signal with the authentication information 21*a* stored in the memory unit 21. Then, if the authentication information included in the confirmation signal accords with the authentication information 21*a*, the control unit 20 of the vehicle key 2 determines that the authentication information included in the confirmation signal is appropriate and that the confirmation signal is a signal from the appropriate controller 1 (namely, the authentication processing has succeeded).

The control unit 20 of the vehicle key 2 determines whether or not the authentication processing has succeeded (S33), and if it is determined that the authentication processing has not succeeded (S33: NO), the control unit 20 terminates the processing. Incidentally, failure of the authentication processing includes not only a case where the authentication information included in the received confirmation signal is not appropriate but also, for example, a case where the received confirmation signal includes no authentication information.

If it is determined that the authentication processing has succeeded (S33: YES), the control unit 20 transmits a response signal including the authentication information 21*a* stored in the memory unit 21 by the wireless communication unit 23 (S34), and terminates the processing. Incidentally, the response signal transmitted in step S34 is received by the controller 1 in step S4, S16 or S21 of FIG. 3A or 3B.

Through the aforementioned processing, in the door lock system of the present embodiment, if the second operation is performed on the driver's seat side button 12*a* (or the front passenger seat side button 12*b*) when the doors D1 and D2 of the vehicle C are in the locked state, the doors D1 and D2 are unlocked, and thereafter, the sliding door D2 for the rear seat behind the driver's seat (or the front passenger seat) is opened. Accordingly, if a user performs the second operation once on the driver's seat side button 12*a* or the front passenger seat side button 12*b* when the doors D1 and D2 are in a locked state, the unlocking operation of the doors D1 and D2 and the opening operation of the sliding door D2 can be both performed, and thus, good operability is obtained. Besides, if the user performs the second operation on the driver's seat side button 12*a*, the sliding door D2 for the rear seat behind the driver's seat alone is opened, and if the user performs the second operation on the front passenger seat side button 12*b*, the sliding door D2 for the rear seat behind the front passenger seat alone is opened. In other words, the user can visually check the sliding door D2 to be opened without opening the other sliding door D2 positioned in a blind spot of the user operating the operation button 12*a* or 12*b*, and thus, safety can be assured.

Beside, in the door lock system of the present embodiment, if the second operation is performed on the driver's seat side button 12*a* (or the front passenger seat side button 12*b*) when the doors D1 and D2 of the vehicle C are in the unlocked state and the sliding door D2 is in the opened state, the sliding door D2 for the rear seat behind the driver's seat (or the front passenger seat) is closed, and thereafter, the doors D1 and D2 are locked. Accordingly, when a user performs the second operation once on the driver's seat side button 12*a* or the front passenger seat side button 12*b*, the closing operation of the sliding door D2 and the locking operation of the doors D1 and D2 can be both performed, and thus, good operability can be obtained. Furthermore, if the user performs the second operation on the driver's seat side button 12*a*, the sliding door D2 for the rear seat behind the driver's seat alone is closed, and if the user performs the second operation on the front passenger seat side button 12*b*, the sliding door D2 for the rear seat behind the front passenger seat alone is closed. In other words, the user can visually check the sliding door D2 to be closed without closing the other sliding door D2 positioned in a blind spot of the user operating the operation button 12*a* or 12*b*, and thus, safety can be assured.

Besides, in the door lock system of the present embodiment, if the first operation is performed on the driver's seat side button 12*a* or the front passenger seat side button 12*b* when the doors D1 and D2 of the vehicle C are in the locked state, the doors D1 and D2 are unlocked. Alternatively, in the door lock system of the present embodiment, if the first operation or the second operation is performed on the driver's seat side button 12*a* or the front passenger seat side button 12*b* when the doors D1 and D2 of the vehicle C are in the unlocked state and the sliding doors D2 are in the closed state, the doors D1 and D2 are unlocked. Since such a constitution of a conventional door lock system is also provided, the operability for a user accustomed to the conventional door lock system can be retained.

In the door lock system of the present embodiment, in accordance with whether a user performs the first operation or the second operation on the operation button 12*a* or 12*b*, the user can instruct whether or not the opening operation (or the closing operation) of the sliding door D2 is to be performed after unlocking the doors (or before locking the doors). In a conventional vehicle, an operation button for automatically opening/closing each sliding door D2 is provided on the sliding door D2, but there is no need to provide such an operation button. Accordingly, since there is no need to provide the operation button on the sliding door D2, the cost can be reduced, and the design of the sliding door D2 is not impaired.

In the door lock system of the present embodiment, if the operation button 12*a* or 12*b* is operated, the controller 1 performs the authentication processing by transmitting/receiving the authentication information to/from the vehicle key 2, so as to determine whether or not the appropriate vehicle key 2 is present within a prescribed range (a communication range) from the vehicle C. Since this authentication processing is performed, merely when a user carrying the appropriate vehicle key 2 operates the operation button 12*a* or 12*b*, the locking/unlocking operation of the doors D1 and D2 and the opening/closing operation of the sliding doors D2 can be performed. Incidentally, the signals transmitted/received between the controller 1 and the vehicle key 2 are preferably encoded. In this case, the control unit 10 of the controller 1 and the control unit 20 of the vehicle key 2 perform encoding processing in transmitting the signals, and perform decoding processing in receiving encoded signals.

Incidentally, the authentication processing performed by the controller 1 is not limited to the aforementioned constitution in which it is performed when the operation button 12*a* or 12*b* is operated. For example, any of the following constitutions may be employed. The controller 1 may periodically transmit a confirmation signal, and if the controller 1 receives a response signal transmitted from the vehicle key 2 in response to the transmitted confirmation signal, the authentication processing may be performed by using authentication information included in the received response signal. Alternatively, the vehicle key 2 may transmit a signal including the authentication information 21*a* periodically or when a user operation is performed on the operation unit 22, and the controller 1 having received this signal may perform the authentication processing by using authentication information included in the received signal.

In the door lock system of the present embodiment, in locking the doors D1 and D2, the controller 1 may detect, on the basis of output signals from various devices present in the vehicle C, whether or not the vehicle key 2 is present within the vehicle C, and may lock the doors D1 and D2 after confirming that the vehicle key 2 is not present within the vehicle C. In this case, the doors D1 and D2 can be prevented from being locked with the vehicle key 2 left in the vehicle C. It can be detected that the vehicle key 2 is not left in the vehicle C depending on, for example, whether or not the vehicle key 2 is left to be inserted into the ignition switch, or whether or not the vehicle key 2 is present outside the vehicle C. Incidentally, also in the case where the doors D1 and D2 are locked by performing the first operation on the operation button 12*a* or 12*b* when the doors D1 and D2 of the vehicle C are in the unlocked state, it may be similarly confirmed that the vehicle key 2 is not present within the vehicle C.

In the door lock system of the present embodiment, the short pressing operation is employed as the first operation to be performed on the operation button 12*a* or 12*b* and the long pressing operation is employed as the second operation. However, these operations are not limited to above-described operations, but may be employed any operations as long as they are different from each other. For example, if the operation buttons 12*a* and 12*b* are pressing type buttons, a double pressing operation in which the button is pressed twice within a prescribed time (of, for example, 5 seconds) may be employed as the second operation with a short pressing operation employed as the first operation.

Besides, the door lock system of the present embodiment may be configured to accept, in addition to the first operation (the short pressing operation) and the second operation (the long pressing operation), a third operation (such as a double pressing operation) as the operation to be performed on the operation buttons 12*a* and 12*b*. Then, if the third operation is performed on the operation button 12*a* or 12*b* when the doors D1 and D2 of the vehicle C are in the locked state, both the sliding doors D2 (namely, the sliding doors D2 for the rear seats behind the driver's seat and the front passenger seat) may be opened after unlocking the doors D1 and D2, and if the third operation is performed when the sliding doors D2 are in the opened state, the doors D1 and D2 may be locked after closing the sliding doors D2 being in the opened state. When this constitution is employed, when the doors D1 and D2 of the vehicle C are in the locked state, both the sliding doors D2 may be opened by performing the third operation on either the driver's seat side button 12*a* or the front passenger seat side button 12*b*. Besides, when the both sliding doors D2 are in the opened state, both the sliding doors D2 may be closed by performing the third operation on either the driver's seat side button 12*a* or the front passenger seat side button 12*b*, and thus, the operability is improved. The first operation, the second operation and the third operation are not limited to the above-described operations, but an operation performed by combining a short pressing operation and a long pressing operation may be employed as each of these operations. For example, an operation in which a short pressing operation and a long pressing operation are alternately repeated by a prescribed number of times (for example, twice, three times or the like), or an operation in which a short pressing operation or a long pressing operation is performed after repeating a short pressing operation and a long pressing operation alternately by a prescribed number of times may be employed.

The vehicle C of the present embodiment is configured to have the driver's seat side button 12*a* on the door handle H1 provided on the driver's seat side and the front passenger seat side button 12*b* on the door handle H1 provided on the front passenger seat side. However, the configuration of the vehicle C is not limited to above-described configuration. For example, both the driver's seat side button 12*a* and the front passenger seat side button 12*b* may be provided on or in the vicinity of the door handle H1 on the driver's seat side. In this case, the doors D1 and D2 can be locked/unlocked and the sliding doors D2 for the rear seats behind the driver's seat and/or the front passenger seat can be opened/closed by operating the driver's seat side button 12*a* and/or the front passenger seat side button 12*b* provided on the door D1 on the driver's seat side. Accordingly, if both the driver's seat side button 12*a* and the front passenger seat side button 12*b* are desired to be operated, a user may come close merely to the door D1 on the driver's seat side, and thus, good operability can be obtained. Furthermore, if both the driver's seat side button 12*a* and the front passenger seat side button 12*b* are provided on the door D1 on the driver's seat side, there is no need to provide an operation button on the door D1 on the front passenger seat side, and therefore, the design of the door D1 on the front passenger seat side can be improved.

Besides, in the vehicle C of the present embodiment, both of the doors for the rear seats are sliding doors D2. However, the vehicle C in which the door lock system of the present invention can be installed is not limited to the vehicle C having the above-described configuration. The door lock system of the present invention can be installed in, for example, a vehicle in which hinge doors H1 are provided on the driver's seat side, the front passenger seat side and a rear seat side behind the driver's seat and a sliding door D2 is provided merely on a rear seat side behind the front passenger seat. In this case, for example, one operation button (corresponding to the front passenger seat side button) 12*b* may be provided on or in the vicinity of the door handle H1 on the driver's seat side. Alternatively, one operation button (corresponding to the front passenger seat side button) 12*b* may be provided on or in the vicinity of the door handle H1 on the front passenger seat side.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A door lock system for locking and unlocking a door of a vehicle provided with a sliding door for a rear seat, comprising:

an operation unit provided on at least one of position on or in the vicinity of an outer surface of a door for a driver's seat of the vehicle and position on or in the vicinity of an outer surface of a door for a front passenger seat, the operation unit accepting a first operation of locking or unlocking the door of the vehicle and a second operation different from the first operation;

a door lock device that unlocks the door;

a door controller that opens the sliding door; and a controller that controls the door lock device and the door controller, wherein the controller only unlocks the door by the door lock device if the operation unit accepts the first operation when the door is in a locked state, and unlocks the door by the door lock device and opens only the sliding door located behind the door provided with the operation unit accepting the second operation by the door controller if the operation unit accepts the second operation when the door is in the locked state, and wherein the operation unit is not provided on the sliding door.

2. The door lock system according to claim 1, wherein the controller closes the sliding door by the door controller, and then locks the door by the door lock device if the operation unit accepts the second operation when the sliding door is in an opened state.

3. The door lock system according to claim 1, further comprising:

a vehicle key that includes a memory unit storing authentication information assigned to the vehicle, and a transmission unit transmitting, by wireless, the authentication information stored in the memory unit;

a wireless reception unit receiving, by wireless, the authentication information transmitted by the vehicle key; and an authentication unit determining whether or not the authentication information received by the wireless reception unit is appropriate, wherein the controller unlocks the door by the door lock device if the authentication unit determines that the authentication information is appropriate.

4. The door lock system according to claim 1, wherein the operation unit is an operation button accepting a pressing operation.

5. The door lock system according to claim 1, wherein the operation unit is a sensor accepting a touch operation or a proximity operation.

6. The door lock system according to claim 1, wherein the operation unit accepts a third operation different from the first operation and the second operation, and if the operation unit provided on the driver's seat side or the front passenger seat side accepts the third operation, the controller opens both sliding doors provided for rear seats on the driver's seat side and the front passenger seat side by the door controller.

7. The door lock system according to claim 4, wherein the first operation is an operation in which a continuous pressing time for the operation button is shorter than a prescribed time, and the second operation is an operation in which the continuous pressing time for the operation button is equal to or longer than the prescribed time.

8. The door lock system according to claim 5, wherein the first operation is an operation in which a continuous touching time or a continuous approximating time to the sensor is shorter than a prescribed time, and the second operation is an operation in which the continuous touching time or the continuous approximating time to the sensor is equal to or longer than the prescribed time.

* * * * *